(12) United States Patent
Hwang et al.

(10) Patent No.: US 8,930,073 B1
(45) Date of Patent: Jan. 6, 2015

(54) METHOD, APPARATUS AND COMPUTER-READABLE RECORDING MEDIA FOR MANAGING A PLURALITY OF APPLICATIONS BY USING HEAD UNIT OF VEHICLE

(71) Applicant: Obigo Inc., Gyeonggi-do (KR)

(72) Inventors: Doe Yun Hwang, Seoul (KR); Byung Soo Song, Seoul (KR); Shin Gyu Kang, Seoul (KR); Han Chul Kim, Seoul (KR)

(73) Assignee: Obigo Inc., Gyeonggi-do (KR)

( * ) Notice: Subject to any disclaimer, the term of this patent is extended or adjusted under 35 U.S.C. 154(b) by 0 days.

(21) Appl. No.: 14/283,704

(22) Filed: May 21, 2014

(30) Foreign Application Priority Data

Apr. 1, 2014 (KR) .......................... 10-2014-0038732

(51) Int. Cl.
*H04W 76/02* (2009.01)
*B60R 16/02* (2006.01)

(52) U.S. Cl.
CPC ...................................... *B60R 16/02* (2013.01)
USPC ............................................ 701/36; 455/411

(58) Field of Classification Search
CPC ...... B60R 16/02; G06F 9/44; G01C 21/3661; G01C 21/3688; H04W 12/08; H04W 12/10; H04W 76/02; H04M 1/6075

USPC ............... 701/36, 491; 455/411, 420; 705/44; 340/5.61; 717/168, 172, 174; 713/168, 713/190; 726/3
See application file for complete search history.

(56) References Cited

U.S. PATENT DOCUMENTS

| | | | |
|---|---|---|---|
| 2012/0208520 A1* | 8/2012 | Howarter et al. | 455/420 |
| 2013/0194068 A1* | 8/2013 | Monig et al. | 340/5.61 |
| 2013/0244634 A1* | 9/2013 | Garrett et al. | 455/418 |
| 2014/0100740 A1* | 4/2014 | Chutorash et al. | 701/36 |
| 2014/0179274 A1* | 6/2014 | O'Meara et al. | 455/411 |

* cited by examiner

*Primary Examiner* — Marthe Marc-Coleman
(74) *Attorney, Agent, or Firm* — Husch Blackwell LLP

(57) ABSTRACT

A method for managing a plurality of applications by using a head unit of a vehicle includes a step of recognizing the plurality of applications installed in at least one of mobile terminals, if being connected with the head unit of the vehicle. Additionally, the method includes the step of performing a process of classifying the recognized applications depending on categories or content types supported by the head unit of the vehicle and a process of authenticating whether the recognized applications are compatible with the head unit of the vehicle. The method also includes the step of maintaining states of the completely classified and authenticated applications being able to be controlled in the head unit of the vehicle by registering the completely classified and authenticated applications in the head unit.

5 Claims, 6 Drawing Sheets

(A)

(B)

(C)

(D)

METHOD, APPARATUS AND COMPUTER-READABLE RECORDING MEDIA FOR MANAGING A PLURALITY OF APPLICATIONS BY USING HEAD UNIT OF VEHICLE

CROSS REFERENCE TO RELATED APPLICATION

This application claims priority to and incorporates herein by reference all disclosure in Korean Patent Application No. 10-2014-0038732 filed Apr. 1, 2014.

FIELD OF THE INVENTION

The present invention relates to a method, an apparatus, and computer-readable recording media for managing a plurality of applications by using a head unit of a vehicle; and more particularly, to the method, the apparatus, and the computer-readable recording media for allowing a user to control combinedly and effectively the plurality of applications within multiple mobile terminals connected with the head unit of the vehicle by recognizing the plurality of applications installed in the multiple mobile terminals, if being connected with the head unit of the vehicle, performing a process of classifying the recognized plurality of applications depending on categories supported by the head unit of the vehicle and a process of authenticating whether the recognized plurality of applications are compatible with the head unit of the vehicle and maintaining states of the completely classified and authenticated applications being able to be controlled in the head unit of the vehicle by registering the completely classified and authenticated applications in the head unit.

BACKGROUND OF THE INVENTION

Today, vehicles have various types of electronic systems, where various types of applications and massive data are used. Vehicle makers make a lot of efforts to develop technologies for improving performance of the electronic systems and applications embedded in vehicles and consistently managing them.

Because the electronic systems and applications embedded in vehicles cannot but use only internal resources of the vehicle and it costs too much and takes too much time to replace the electronic systems embedded therein or install the applications again to upgrade or update them, recently there are attempts to realize electronic systems and applications required for vehicles by using mobile terminals such as a smart phone or a tablet PC commonly carried out by a user, i.e., a driver or a passenger.

Therefore, the inventor intends to suggest a technology of managing a plurality of applications in multiple mobile terminals by using a head unit of a vehicle.

SUMMARY OF THE INVENTION

It is an object of the present invention to solve all the problems mentioned above.

It is another object of the present invention to recognize a plurality of applications installed in multiple mobile terminals connected with a head unit of a vehicle, perform a process of classifying the recognized plurality of applications depending on categories supported by the head unit of the vehicle and a process of authenticating whether the recognized plurality of applications are compatible with the head unit of the vehicle and maintain states of the completely classified and authenticated applications being able to be controlled in the head unit of the vehicle by registering them in the head unit.

In accordance with one aspect of the present invention, there is provided a method for managing a plurality of applications by using a head unit of a vehicle, including steps of: (a) recognizing the plurality of applications installed in at least one of mobile terminals, if being connected with the head unit of the vehicle; (b) performing a process of classifying the recognized applications depending on categories or content types supported by the head unit of the vehicle and a process of authenticating whether the recognized applications are compatible with the head unit of the vehicle; and (c) maintaining states of the completely classified and authenticated applications being able to be controlled in the head unit of the vehicle by registering the completely classified and authenticated applications in the head unit.

In accordance with another aspect of the present invention, there is provided an apparatus for managing a plurality of applications, including: an application recognizing part for recognizing the plurality of applications installed in at least one of mobile terminals, if being connected with the head unit; an application authenticating part for performing a process of classifying the recognized applications depending on categories or content types supported by the head unit of the vehicle and a process of authenticating whether the recognized applications are compatible with the head unit of the vehicle; and an application registering part for maintaining states of the completely classified and authenticated applications being able to be controlled in the head unit of the vehicle by registering the completely classified and authenticated applications therein.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
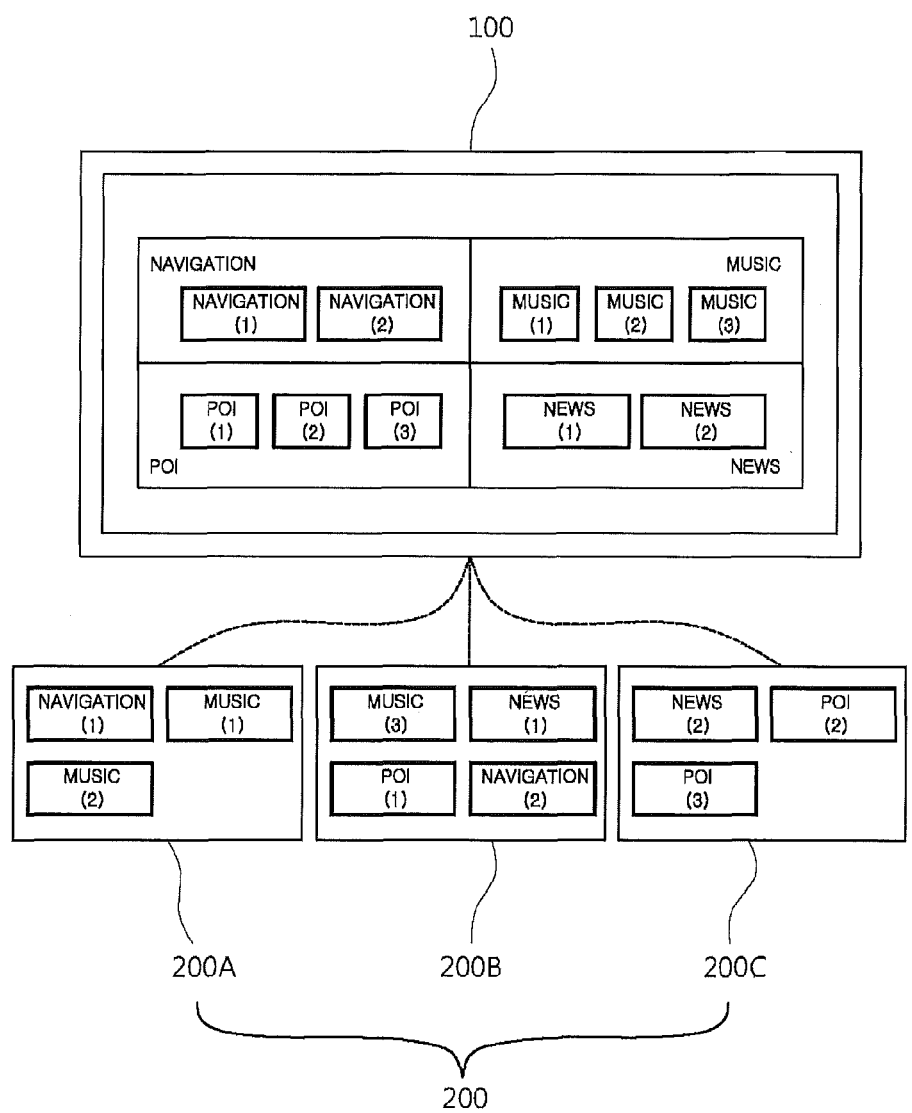
FIG. 1 is a drawing exemplarily showing a configuration of a whole system to implement the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of the Whole System

FIG. 1 is a drawing exemplarily showing a configuration of a whole system to implement the present invention.

As illustrated in FIG. 1, the whole system in accordance with an example embodiment of the present invention may include a head unit 100 of a vehicle and one or more mobile terminals 200.

In accordance with an example embodiment of the present invention, the head unit 100 of the vehicle, first of all, may perform a function of connecting its template with one or more applications executed in the mobile terminals 200, providing information inputted from the applications executed in the mobile terminals 200 for a user through its template, and delivering control information inputted through its template by the user to the applications executed in the mobile terminals 200 and also allowing the user to use a variety of applications executed in the mobile terminals 200 through its integrated template of the head unit 100 by doing such.

Herein, it is made clear that the integrated template as stated in this specification does not mean only one template and an internal component of the template may be changed depending on categories to which applications interoperated with the template belong or the provided information.

In accordance with an example embodiment of the present invention, a plurality of applications installed in multiple mobile terminals 200 connected with the head unit 100 of the vehicle may be recognized and a process of classifying the plurality of applications recognized depending on categories supported by the head unit of the vehicle and a process of authenticating whether the plurality of applications recognized as shown above are compatible with the head unit 100 of the vehicle may be performed. States of the completely classified and authenticated applications being able to be controlled in the head unit 100 of the vehicle may be maintained by registering them in the head unit 100. By doing these, the user may be allowed to control the plurality of applications installed in the multiple mobile terminals 200 connected with the head unit 100 of the vehicle combinedly and effectively by using the head unit 100 of the vehicle.

The internal configuration of the head unit 100 of the vehicle will be explained in detail in the "configuration of the head unit of the vehicle" to be described below.

In addition, the mobile terminal 200 in accordance with an example embodiment of the present invention is a digital device that includes a function communicable with the head unit 100 of the vehicle. Such digital devices, including a smart phone, a tablet PC, a PDA, a personal computer (e.g., laptop, etc.), a web pad, or a mobile phone, etc., which have memory means and microprocessors with a calculation ability, may be adopted as the mobile terminal 200 in accordance with the present invention. Besides, a variety of applications such as a web browser, a widget, a navigation system, a music playing means, an e-map, etc. may be installed in the mobile terminal 200 in accordance with an example embodiment of the present invention and such applications may be operated in connection with a template of the head unit 100 of the vehicle.

In accordance with an example embodiment of the present invention, the head unit 100 of the vehicle and the mobile terminals 200 may be connected with each other through a diversity of telecommunication channels in a wired or wireless communication method, for example, Wi-Fi, Bluetooth (BT), Universal Serial Bus (USB), etc.

Configuration of the Head Unit of the Vehicle

Below will be explanation on an internal configuration and components of the head unit 100 of the vehicle that performs important functions to implement the present invention.

Figure 2:
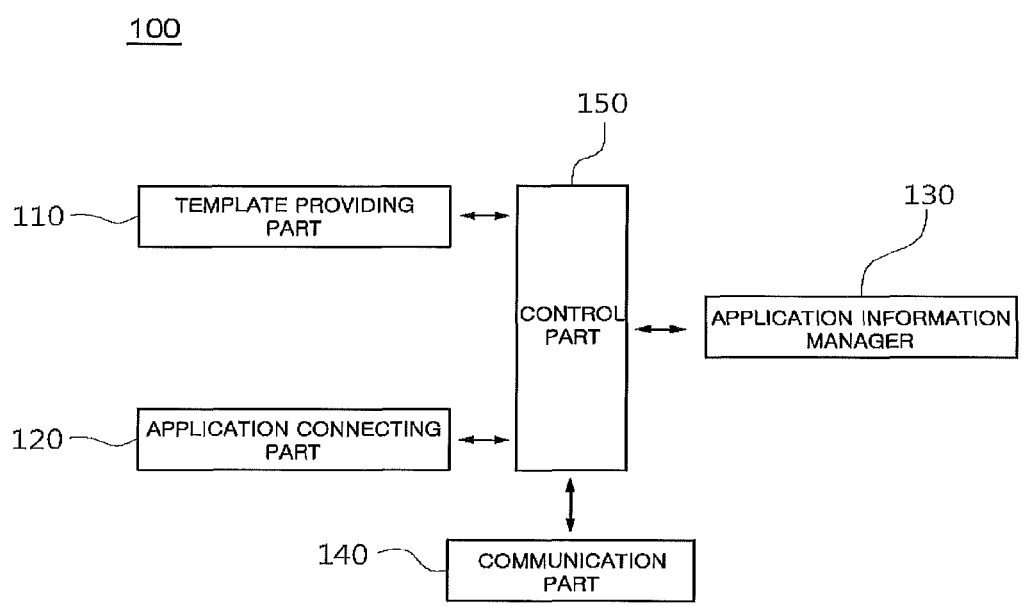
FIG. 2 is a drawing exemplarily illustrating an internal configuration of a head unit of a vehicle in accordance with an example embodiment of the present invention.

FIG. 2 is a drawing exemplarily illustrating an internal configuration of the head unit 100 of the vehicle in accordance with an example embodiment of the present invention.

By referring to FIG. 2, the head unit 100 of the vehicle in accordance with one example embodiment of the present invention may include a template providing part 110, an application connecting part 120, an application information manager (AIM) 130, a communication part 140 and the control part 150. Herein, the AIM 130 may include at least some of an application recognizing part (not illustrated), an application authenticating part (not illustrated), an application registering part (not illustrated), an application policy managing part (not illustrated), an application state managing part (not illustrated), etc. In accordance with an example embodiment of the present invention, at least some of the template providing part 110, the application connecting part 120, the AIM 130, the communication part 140 and the control part 150 may be program modules communicating with the head unit 100 of the vehicle. Such program modules may be included in the head unit 100 of the vehicle in a form of an operating system, an application program module, and other program modules or physically stored in various storage devices well known to those skilled in the art. In addition, they may be stored in a remote storage device capable of communicating with the head unit 100 of the vehicle. The program modules may include but not be subject to a routine, a subroutine, a program, an object, a component, and a data structure for executing a specific operation or a type of specific abstract data that will be described in accordance with the present invention.

First of all, the template providing part 110 in accordance with an example embodiment of the present invention may provide a template operated in connection with one or more applications of one or more mobile terminals 200 connected with the head unit 100 of the vehicle. At the time, it could be assumed that components of template could be rearranged by referring to categories of applications, types of contents provided by applications, etc. and the template whose components are rearranged as such could be provided on the screen of the head unit 100 of the vehicle. More specifically, it could be configured that information inputted from applications executed in the mobile terminals 200 is displayed through the template on the screen of the head unit 100 and control information inputted by the user through the template is delivered to a corresponding application among the applications executed in the mobile terminals 200. In other words, the user may get information inputted from a variety of applications in the mobile terminals 200 through the template of the head unit 100 of the vehicle (i.e., a template-based UI) and control a function of the applications therein by inputting a gesture through the template of the head unit 100.

More specifically, the template in accordance with an example embodiment of the present invention may be configured in a combined form of all being compatible with the plurality of applications executed in the multiple mobile terminals 200A, 200B, and 200C. Therefore, the head unit 100 of the vehicle may be operated in connection with the plurality of applications executed in the multiple mobile terminals 200A, 200B, and 200C only by managing the template in the combined form. To achieve this, the template of the head unit 100 of the vehicle and the applications in the mobile terminals 200 may share software library required to operate in connection with each other.

Figure 3A:
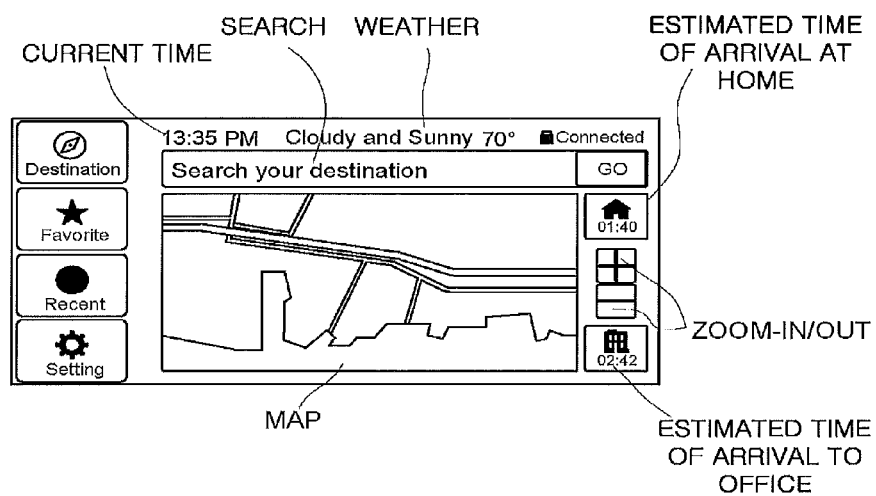
FIGS. 3A and 3B are diagrams exemplarily representing states of display of the head unit of the vehicle in accordance with an example embodiment of the present invention.
Figure 3B:
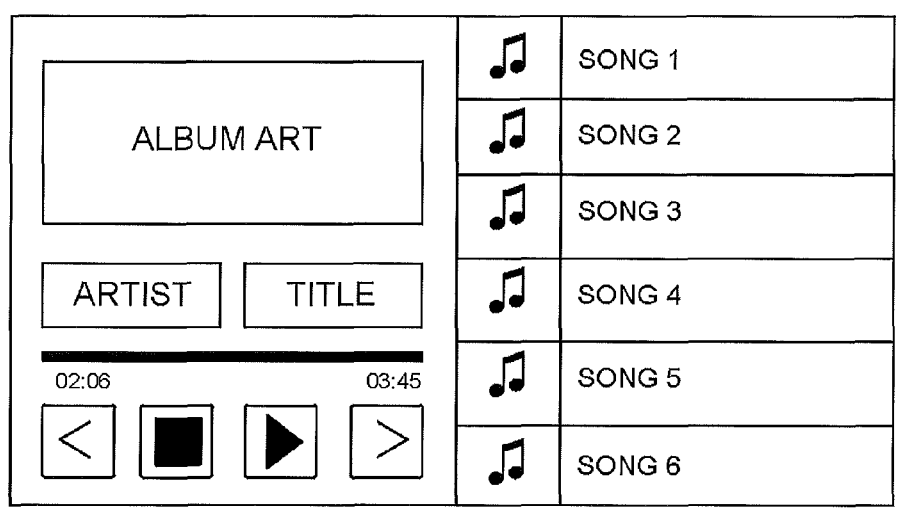

FIGS. 3A and 3B are diagrams exemplarily representing states of display of the head unit of the vehicle in accordance with an example embodiment of the present invention.

By referring to FIG. 3A, a navigation template interoperable with one or more navigation applications of the mobile terminals 200 may include components such as map, search, weather, current time, estimated time of arrival (or ETA) at home, ETA at office, zoom-in and out. By referring to FIG. 3B, a music playing template interoperable with one or more music playing applications in the mobile terminals 200 may include a currently playing song, a control tool, and a playlist as components. In accordance with an example embodiment of the present invention, components included in the template may perform a function of displaying information transmitted from the navigation applications in the mobile terminals 200 connected with the head unit 100 of the vehicle or delivering control information inputted through the template by the user to the navigation applications therein.

Next, the application connecting part 120 in accordance with an example embodiment of the present invention may perform a function of supporting the template of the head unit 100 of the vehicle and the applications in the mobile terminals 200 to be operable in connection with each other.

More specifically, the application connecting part 120 in accordance with an example embodiment of the present invention may perform a function of allowing event information or content information generated at the applications in the mobile terminals 200 to be delivered to the template of the head unit 100 of the vehicle and allowing event information or content information generated at the template of the head unit 100 of the vehicle to be delivered to the applications in the mobile terminals 200.

In accordance with an example embodiment of the present invention, the AIM 130 may perform a function of recognizing one or more applications installed in at least one of the mobile terminals 200, if being connected with the head unit 100 of the vehicle. More specifically, while the AIM 130 does not perform any operation without a mobile terminal 200 being connected and if a mobile terminal 200 is connected through a telecommunication channel, the AIM 130 in accordance with an example embodiment of the present invention may recognize the applications installed in the mobile terminal 200 and collect and manage information on the applications.

Besides, the AIM 130 in accordance with an example embodiment of the present invention may perform a function of classifying the applications recognized as shown above depending on categories or content types supported by the head unit 100 of the vehicle, e.g., a music playing application, a navigation application, a POI application, a news application, etc. (i.e., a classification process). For applications which do not correspond to the categories or content types supported by the head unit 100 of the vehicle (i.e., applications not supported by the head unit 100 of the vehicle), the AIM 130 in accordance with an example embodiment of the present invention may not conduct a course of authentication and a course of registration to be explained below. In other words, the classification course may be also a course of sorting out applications supported by the head unit 100 of the vehicle among the plurality of applications installed in the mobile terminals 200.

Besides, the AIM 130 in accordance with an example embodiment of the present invention may perform a function of authenticating whether the applications recognized as shown above are compatible with the head unit 100 of the vehicle, i.e., whether they could be properly operated in connection with the head unit 100 of the vehicle (i.e., an authentication process).

In a more specific way, the AIM 130 in accordance with an example embodiment of the present invention may certify whether the applications could be operated in connection with the template of the head unit 100 of the vehicle. Herein, the applications compatible, i.e., operable in connection, with the template of the head unit 100 of the vehicle indicate those from which the user, through the template of the head unit 100 of the vehicle, may get information transmitted and whose functions could be controlled when the user operates the template thereof. The applications compatible with the template of the head unit 100 of the vehicle could include software library required to operate in connection with the template thereof.

In accordance with an example embodiment of the present invention, it is made clear that there is no priority on between processes of classifying and authenticating the plurality of applications on their performance and two processes may be performed simultaneously, as the case may be.

Moreover, the AIM 130 in accordance with an example embodiment of the present invention may perform a function of maintaining states of the applications completely classified and authenticated as mentioned above being controlled in the head unit 100 of the vehicle by registering them therein.

Besides, the AIM 130 in accordance with an example embodiment of the present invention may perform a function of displaying information on the applications completely classified and authenticated, e.g., a list of the applications completely classified and authenticated, on the screen of the head unit 100 of the vehicle by referring to states classified depending on categories or content types supported by the head unit 100 of the vehicle. Thus, as the user may select an application she/he wants to use intuitively among the applications displayed on the screen of the head unit 100 of the vehicle, the effect of being able to maximize the availability of the applications installed in the mobile terminals 200 connected with the head unit 100 of the vehicle is achieved. The plurality of applications could be acquired from multiple terminals but could be also acquired from one terminal.

In addition, the application policy managing part (not illustrated) of the AIM 130 in accordance with an example embodiment of the present invention also may perform a function of managing policies applied to the applications completely classified and authenticated and then registered in the head unit 100 of the vehicle, e.g., policies on running, sound output, vehicle function treatment of an application.

In accordance with an example embodiment of the present invention, the application state managing part (not illustrated) of the AIM 130 may perform a function of controlling operating states of the applications completely classified and authenticated and then registered in the head unit 100 of the vehicle by referring to the policies applied thereto (i.e., a policy defined by a vehicle or its head unit 100). For example, the AIM 130 may control a partial function of at least one application to be limited if a driving speed of a vehicle becomes higher. For another example, the head unit 100 of the vehicle could be controlled to block audio signal powered from the applications if the audio signal is powered from the head unit 100.

In accordance with an example embodiment of the present invention, the applications that have been registered in the head unit 100 of the vehicle could be deleted as a request for deletion is inputted by the user or the head unit 100 of the vehicle and the mobile terminals 200 are disconnected. In such a case, since even the authentication-related data that have been created during the course of authentication of the applications are also deleted, the applications should be authenticated again before the applications are registered again to the head unit 100 later. Accordingly, the integrity of the authentication could be guaranteed.

Figure 4:
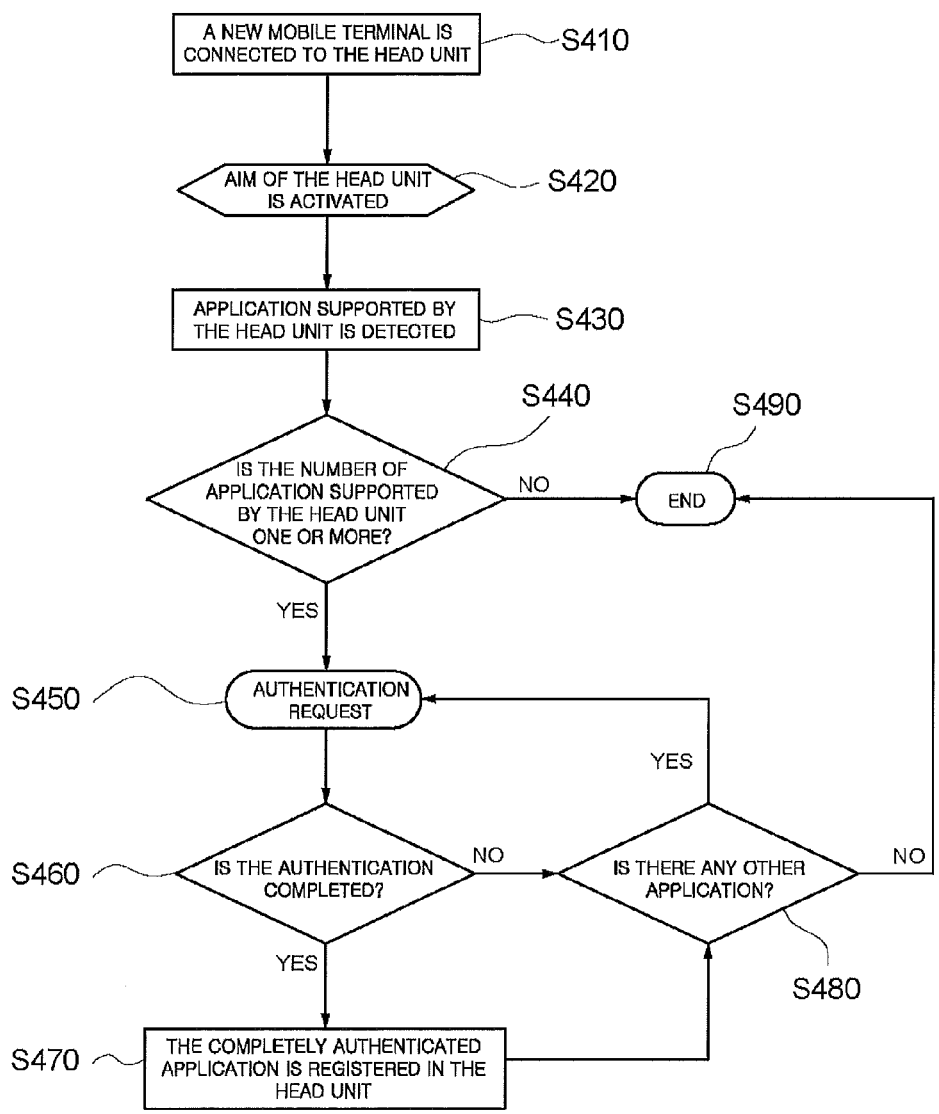
FIG. 4 is a drawing exemplarily showing a course of an application of a newly connected mobile terminal being registered in the head unit of the vehicle in accordance with an example embodiment of the present invention.

FIG. 4 is a drawing exemplarily showing a course of an application of a newly connected mobile terminal being registered in the head unit of the vehicle in accordance with an example embodiment of the present invention.

By referring to FIG. 4, if a new mobile terminal 200 is connected to the head unit 100 of the vehicle, the AIM 130 of the head unit 100 of the vehicle is activated at steps of S410 and S420 and the AIM 130 activated as such may detect whether one or more applications belonging to the categories or the content types supported by the head unit 100 of the vehicle are included (i.e., installed) in the newly connected mobile terminal 200 at steps of S430 and S440.

Continuously, by referring to FIG. 4, if no application belonging to the categories or the content types supported by the head unit 100 of the vehicle is installed in the newly connected mobile terminal 200, a course of registering the application may be closed at a step of S490.

In addition, by referring to FIG. 4, if one or more applications belonging to the categories or the content types supported by the head unit 100 of the vehicle are installed in the newly connected mobile terminal 200, whether the applications are compatible with the head unit 100 of the vehicle, i.e., whether it can be properly operated in connection with the head unit 100 of the vehicle may be authenticated at steps of S450 and S460 and the completely authenticated applications may be registered in the head unit 100 of the vehicle at a step of S470.

If the applications are registered in the head unit 100 of the vehicle through the course of registering the applications as explained above, the AIM 130 in accordance with an example embodiment of the present invention may perform a function of displaying information on the applications, e.g., a list of the applications, on the screen of the head unit 100 of the vehicle by referring to states classified depending on the categories or the content types supported by the head unit 100 of the vehicle.

In FIG. 4, explanation was made in center of the example embodiments under which the classification process is performed earlier than the authentication process but it is made clear that the classification process may be performed later than, or simultaneously with, the authentication process within the scope of achieving the objects of the present invention.

Figure 5:
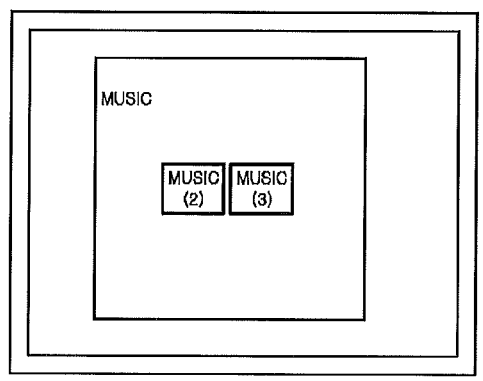
FIG. 5 is a drawing that exemplarily shows configurations of displaying information on multiple applications on a screen of the head unit of the vehicle in accordance with an example embodiment of the present invention.
Figure 5:
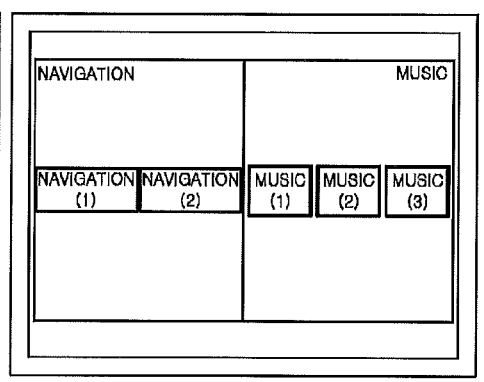
Figure 5:
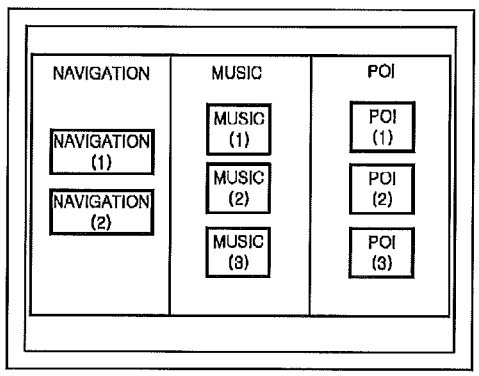
Figure 5:
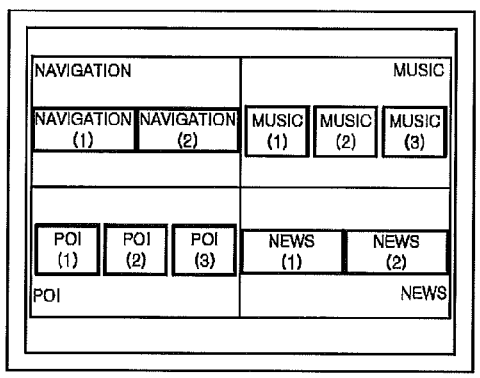

FIG. 5 is a drawing that exemplarily shows configurations of displaying information on multiple applications on a screen of the head unit of the vehicle in accordance with an example embodiment of the present invention.

By referring to FIG. 5, the applications registered in the head unit 100 of the vehicle, i.e., a music playing application, a navigation application, a POI application, a news application, etc. may be displayed by referring to states classified depending on the categories or the content types.

In accordance with an example embodiment of the present invention, the communication part 140 may perform a function of the head unit 100 of the vehicle being able to communicate with an external system such as the mobile terminals 200.

Lastly, the control part 150 in accordance with an example embodiment of the present invention performs a function of controlling data flow among the template providing part 110, the application connecting part 120, the AIM 130 and the communication part 140. In other words, the control part 150 controls the template providing part 110, the application connecting part 120, the AIM 130 and the communication part 140 to allow each part to perform its unique functions by controlling the flow of data from/to outside or between the components of the head unit 100 of the vehicle.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

In accordance with the present invention, a user may control a plurality of applications within multiple mobile terminals connected with a head unit of a vehicle combinedly and effectively by using the head unit of the vehicle.

In accordance with the present invention, a variety of applications in the multiple mobile terminals, besides, may be perfectly applied to the head unit of the vehicle because multiple registrations, user selection, execution management, etc. for the applications therein could be easily made in the head unit of the vehicle.

In accordance with the present invention, the availability of the applications installed in the mobile terminals connected with the head unit of the vehicle may be maximized because the user may select an application s/he wants to use intuitively through a human machine interface or a HMI provided through the head unit of the vehicle.

What is claimed is:

1. A method for managing a plurality of applications by using a head unit of a vehicle, comprising steps of:
   (a) the head unit recognizing the plurality of applications installed in at least one mobile terminal, upon connection of said at least one mobile terminal with the head unit;
   (b) the head unit performing a process of classifying the recognized applications into one or more application groups depending on categories or content types supported by the head unit, and a process of authenticating whether the recognized applications are compatible with the head unit; and
   (c) the head unit providing information on said application groups including the classified and authenticated applications of the at least one mobile terminal through a screen associated with the head unit to thereby maintain states of the classified and authenticated applications being able to be controlled in the head unit, wherein a K-th application group among all N application groups including the classified and authenticated applications of the mobile terminal is displayed through a K-th segmented portion of the screen among all N segmented portions of the screen and wherein the K-th application group includes at least one application which is classified as a K-th category or a K-th content type and K is an integer from 1 to N.

2. The method of claim 1, further comprising a step of: (d) deleting authentication-related data created and stored in the head unit of the vehicle during a course of authenticating a specific application among the completely classified and authenticated applications, if the specific application is deregistered.

3. An apparatus for managing a plurality of applications, comprising:
   a head unit including:
      an application recognizing part for recognizing the plurality of applications installed in at least one mobile terminal, upon connection of said at least one mobile terminal with the head unit;
      an application authenticating part for performing a process of classifying the recognized applications into one or more application groups depending on categories or content types supported by the head unit and a process of authenticating whether the recognized applications are compatible with the head unit; and
      an application registering part for providing information on said application groups including the classified and authenticated applications of the at least one mobile terminal through a screen associated with the head unit to thereby maintain states of the classified and authenticated applications being able to be controlled in the head unit wherein a K-th application group among all N application groups including the classified and authenticated applications of the mobile terminal is displayed through a K-th segmented portion of the screen among all N segmented portions of the screen and wherein the K-th application group includes at least one application which is classified as a K-th category or a K-th content type and K is an integer from 1 to N.

4. The apparatus of claim 3, wherein the application registering part deletes authentication-related data created and stored in the head unit of the vehicle during a course of authenticating a specific application among the completely classified and authenticated applications, if the specific application is deregistered.

5. One or more non-transitory computer-readable recording media having stored thereon a computer program that, when executed by one or more processors, causes the one or more processors to perform acts including:
   (a) the head unit recognizing the plurality of applications installed in at least one mobile terminal, upon connection of said at least one mobile terminal with the head unit;
   (b) the head unit performing a process of classifying the recognized applications into one or more application groups depending on categories or content types supported by the head unit and a process of authenticating whether the recognized applications are compatible with the head unit; and
   (c) the head unit information on said application groups including the classified and authenticated applications of the at least one mobile terminal through a screen associated with the head unit to thereby maintain states of the classified and authenticated applications being able to be controlled in the head unit, wherein a K-th application group among all N application groups including the classified and authenticated applications of the mobile terminal is displayed through a K-th segmented portion of the screen among all N segmented portions of the screen and wherein the K-th application group includes at least one application which is classified as a K-th category or a K-th content type and K is an integer from 1 to N.

\* \* \* \* \*